(12) United States Patent
Bizub

(10) Patent No.: US 9,903,778 B2
(45) Date of Patent: Feb. 27, 2018

(54) METHODS AND SYSTEMS TO DERIVE KNOCK SENSOR CONDITIONS

(71) Applicant: General Electric Company, Schenectady, NY (US)

(72) Inventor: Jeffrey Jacob Bizub, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 457 days.

(21) Appl. No.: 14/617,458

(22) Filed: Feb. 9, 2015

(65) Prior Publication Data

US 2016/0231190 A1  Aug. 11, 2016

(51) Int. Cl.
*G01L 23/22* (2006.01)
*F02D 41/00* (2006.01)
*F02D 41/22* (2006.01)
*F02D 35/02* (2006.01)
*G01M 15/12* (2006.01)
*F02P 5/152* (2006.01)
*F02D 41/14* (2006.01)
*F02D 41/28* (2006.01)

(52) U.S. Cl.
CPC .......... *G01L 23/225* (2013.01); *F02D 35/027* (2013.01); *F02D 41/009* (2013.01); *F02D 41/222* (2013.01); *G01M 15/12* (2013.01); F02D 2041/1432 (2013.01); F02D 2041/286 (2013.01); *F02P 5/1526* (2013.01); Y02T 10/40 (2013.01)

(58) Field of Classification Search
CPC ................ F02B 77/085; F02P 5/1526; F02M 2700/1394; F02D 35/027; F02D 41/222; G01M 15/11; G01M 15/12; G01L 23/221; G01L 23/225; G01L 23/226
See application file for complete search history.

(56) References Cited

U.S. PATENT DOCUMENTS

| 4,606,316 | A | * | 8/1986 | Komurasaki | F02P 5/1526 123/406.16 |
| 4,644,918 | A | * | 2/1987 | McDermott | F02P 5/152 123/406.37 |
| 4,693,221 | A | * | 9/1987 | Nakajima | F02P 11/06 123/406.16 |
| 5,029,565 | A | | 7/1991 | Talbot | |
| 5,060,615 | A | * | 10/1991 | Hashimoto | G01L 23/225 123/406.16 |
| 5,111,790 | A | | 5/1992 | Grandy | |
| 5,115,778 | A | | 5/1992 | Holroyd | |
| 5,119,783 | A | | 6/1992 | Komurasski | |
| 5,241,480 | A | | 8/1993 | Takaku et al. | |

(Continued)

FOREIGN PATENT DOCUMENTS

| CN | 203480037 | 3/2014 |
| EP | 0095520 A1 | 12/1983 |

(Continued)

OTHER PUBLICATIONS

European Search Report and Opinion issued in connection with corresponding EP Application No. 16154442.4 dated Jun. 24, 2016.

(Continued)

*Primary Examiner* — Joseph Dallo
*Assistant Examiner* — Anthony L Bacon
(74) *Attorney, Agent, or Firm* — Fletcher Yoder, P.C.

(57) ABSTRACT

A method of diagnosing a knock sensor includes steps of receiving data from the knock sensor, the knock sensor configured to be coupled to an engine, processing the data to derive one or more events from the data, and determining whether the one or more events took place at a known time or a known crank position.

20 Claims, 6 Drawing Sheets

(56) References Cited

U.S. PATENT DOCUMENTS

| | | | |
|---|---|---|---|
| 5,257,533 A | 11/1993 | Imada | |
| 5,333,489 A | 8/1994 | Dreyer | |
| 5,337,240 A | 8/1994 | Nakagawa et al. | |
| 5,339,245 A | 8/1994 | Hirata et al. | |
| 5,361,213 A | 11/1994 | Fujieda et al. | |
| 5,392,642 A | 2/1995 | Tao | |
| 5,400,648 A | 3/1995 | Mahr | |
| 5,452,699 A | 9/1995 | Rossignol | |
| 5,467,638 A | 11/1995 | Philipp | |
| 5,517,969 A * | 5/1996 | Unland | G01L 23/225 123/406.16 |
| 5,522,254 A * | 6/1996 | Kamabora | G01L 23/225 73/114.07 |
| 5,594,649 A | 1/1997 | Cook et al. | |
| 5,693,936 A | 12/1997 | Komachiya et al. | |
| 5,763,769 A | 6/1998 | Kluzner | |
| 5,837,887 A | 11/1998 | Shibata et al. | |
| 5,905,193 A | 5/1999 | Hashizume et al. | |
| 5,932,801 A | 8/1999 | Akishita et al. | |
| 5,934,256 A | 8/1999 | Wenzlawski et al. | |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,330,877 B1 | 12/2001 | Nordin | |
| 6,336,355 B1 | 1/2002 | Sasaki et al. | |
| 6,448,778 B1 * | 9/2002 | Rankin | G01R 31/007 324/503 |
| 6,550,311 B2 | 4/2003 | Sloboda | |
| 6,598,468 B2 | 7/2003 | Zur Loye et al. | |
| 6,662,781 B1 | 12/2003 | Torno et al. | |
| 6,814,054 B2 | 11/2004 | Sauler et al. | |
| 6,862,517 B2 | 3/2005 | Gaitier | |
| 6,885,932 B2 | 4/2005 | Liu et al. | |
| 6,889,655 B1 * | 5/2005 | Demizu | F02P 5/1526 123/406.16 |
| 6,912,460 B2 | 6/2005 | Sauler et al. | |
| 6,947,829 B2 | 9/2005 | Honda | |
| 6,978,771 B2 | 12/2005 | Kuzuyama et al. | |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,181,338 B2 | 2/2007 | Takemura et al. | |
| 7,191,658 B2 | 3/2007 | Oda et al. | |
| 7,212,909 B2 | 5/2007 | Yoshino et al. | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,816 B2 | 6/2008 | Zurlo | |
| 7,444,231 B2 | 10/2008 | Ancimer et al. | |
| 7,444,236 B2 | 10/2008 | Wiles | |
| 7,448,254 B2 | 11/2008 | Kurtz et al. | |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Lin et al. | |
| 7,669,582 B2 | 3/2010 | Huang | |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 8,000,884 B2 | 8/2011 | Aso et al. | |
| 8,032,293 B2 | 10/2011 | Binder et al. | |
| 8,069,972 B2 | 12/2011 | Auclair et al. | |
| 8,078,389 B2 | 12/2011 | Huang et al. | |
| 8,079,261 B2 | 12/2011 | Crickmore et al. | |
| 8,108,131 B2 | 1/2012 | Huang et al. | |
| 8,155,857 B2 | 4/2012 | Loeffler et al. | |
| 8,250,905 B2 | 8/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,359,909 B2 | 1/2013 | Duval et al. | |
| 8,396,649 B2 | 3/2013 | Huang | |
| 8,463,533 B2 | 6/2013 | Glugla et al. | |
| 8,499,623 B2 | 8/2013 | Duval et al. | |
| 8,528,521 B2 | 9/2013 | Landsmann et al. | |
| 8,538,666 B2 | 9/2013 | Buslepp et al. | |
| 8,606,484 B2 | 12/2013 | Ohata | |
| 8,627,800 B2 | 1/2014 | Glugla et al. | |
| 8,639,432 B2 | 1/2014 | Matsu et al. | |
| 8,677,975 B2 | 3/2014 | Auclair et al. | |
| 8,680,707 B2 | 3/2014 | Childs et al. | |
| 8,849,471 B2 | 9/2014 | Daniel et al. | |
| 2001/0015197 A1 * | 8/2001 | Elliott | F02D 35/027 123/406.16 |
| 2001/0042398 A1 * | 11/2001 | Sloboda | F02D 35/027 73/35.04 |
| 2003/0102175 A1 * | 6/2003 | Wakashiro | B60K 6/485 180/65.26 |
| 2006/0236753 A1 * | 10/2006 | Yoshihara | G01L 23/225 73/35.09 |
| 2007/0028893 A1 * | 2/2007 | Hernandez | F02P 5/1526 123/406.16 |
| 2007/0137284 A1 | 6/2007 | Kluth et al. | |
| 2009/0048729 A1 * | 2/2009 | Waters | G01M 15/042 701/31.4 |
| 2009/0211337 A1 * | 8/2009 | Masuda | G01L 23/225 73/35.09 |
| 2009/0223281 A1 * | 9/2009 | Masuda | G01L 23/225 73/35.09 |
| 2010/0168991 A1 * | 7/2010 | Hamama | F02D 35/027 701/111 |
| 2014/0000552 A1 | 1/2014 | Glugla et al. | |
| 2014/0288762 A1 * | 9/2014 | Sakayori | F02D 41/123 701/31.3 |
| 2015/0139430 A1 * | 5/2015 | Miyata | H04R 29/002 381/56 |
| 2016/0097799 A1 * | 4/2016 | Rocher | G01L 27/002 324/537 |

FOREIGN PATENT DOCUMENTS

| | | |
|---|---|---|
| EP | 0569608 A1 | 11/1993 |
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

Reduction Piston Slap Excitation by Optimizing Piston Profiles; Takayuki Koizumi et al,; Proc. of 2002 IMAC-XX: Conf, & Exposition on Structural Dynamics, Jun. 12-15, 2000.

VE Piston Dynamics; FEV Group, Inc., available online; www.fev.com/what-we-do/software/virtual-engine-powertrain-dynamics-simulation/piston-dynamics-module; Jan. 1, 2015.

Diagnostic Internal Combustion Engine Based on Crankshaft Angular Acceleration; Binh Le Khac, Tuma J.; available online; www.researchgate.net, May 2012.

Bolt loosening detection using vibration characteristics of thin plate with piezoelectric elements;Takeshi Nakahara et al; Proc. of SPIE 5391, Smart Struc. & Materials, Jul. 2004.

* cited by examiner

METHODS AND SYSTEMS TO DERIVE KNOCK SENSOR CONDITIONS

BACKGROUND

The subject matter disclosed herein relates to knock sensors, and more specifically, to knock sensors mounted to large, multi-cylinder combustion engines for component condition detection.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power.

Knock sensors can be used to monitor multi-cylinder combustion engines. A knock sensor can be mounted to the exterior of an engine cylinder and used to determine whether or not the engine is running as desired. Knock sensors are typically checked by measuring the impedance of the knock sensor, which may require the engine to be shut down. Measuring the impedance of the knock sensor indicates only whether the knock sensor is present, not whether the knock sensor is functioning properly or wired correctly. It would be desirable to improve the derivation of knock sensor conditions.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method of diagnosing a knock sensor includes steps of receiving data from the knock sensor, the knock sensor configured to be coupled to an engine, processing the data to derive one or more events from the data, and determining whether the one or more events took place at a known time or a known crank position.

In a second embodiment, a system includes an engine control unit configured to control an engine, the engine control unit having a processor. The processor is configured to receive a noise signal sensed by a knock sensor, the knock sensor configured to be coupled to an engine, process the noise signal to derive a combustion signature, a valve signature, and one or more events from the noise signal, and determine whether the one or more events took place at a known time, at a known crank angle, or a combination thereof.

In a third embodiment, a non-transitory computer readable medium includes executable instructions that when executed cause a processor to receive engine noise data from a knock sensor, the knock sensor configured to be coupled to an engine, process the engine noise data to derive a combustion signature, derive a valve signature, and derive one or more events from the data, and use a lookup table to determine which of the one or more events should be occurring during operation of the engine at the known time or at the known crankshaft angle. The lookup table includes a first column and a first row, the first column corresponding to the time or crank angle, and the first row corresponds to a table event or an amplitude.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Determining certain conditions, such as whether or not a knock sensor mounted on a combustion engine is working, typically involves shutting down the engine and testing the impedance of the sensor. Measuring the impedance of the knock sensor only indicates whether or not the sensor is present, not whether the sensor is functioning properly or wired properly. As such, it would be beneficial to have a way to determine whether the knock sensor is functioning properly and/or wired properly by processing the data captured by the knock sensor, without having to shut down the engine. For example, in one embodiment, data captured by a knock sensor over one or more cycles is run through one or more filters to derive signatures that correspond to the combustion signature and the valve signature. Events (e.g., combustion, peak firing pressure, valve closing, valve opening, etc.) may then be derived from the signals. Because events happen in a known order and at known time intervals, the phasing of events between the two signals may be compared to each other or referenced against a lookup table to determine whether the knock sensor is working properly and/or miswired.

Figure 1:
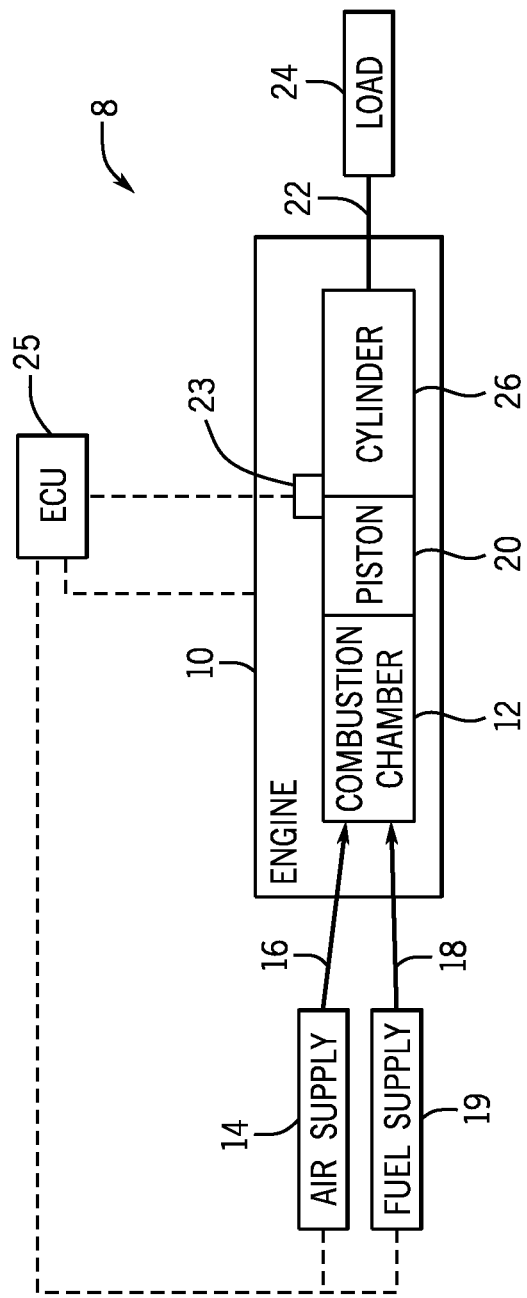
FIG. 1 is a block diagram of an embodiment of an engine driven power generation system in accordance with aspects of the present disclosure.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may sense vibrations caused by the engine 10, such as vibration due to detonation, pre-ignition, and or pinging. The knock sensor 23 is shown communicatively coupled to an engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain vibrations should be further analyzed and categorized to detect, for example, undesired engine conditions, including conditions related to the knock sensor itself. Indeed, by analyzing certain cycle(s) of knock sensor data, the techniques described herein may derive whether the knock sensor is wired correctly, and whether the knock sensor is functioning properly.

Figure 2:
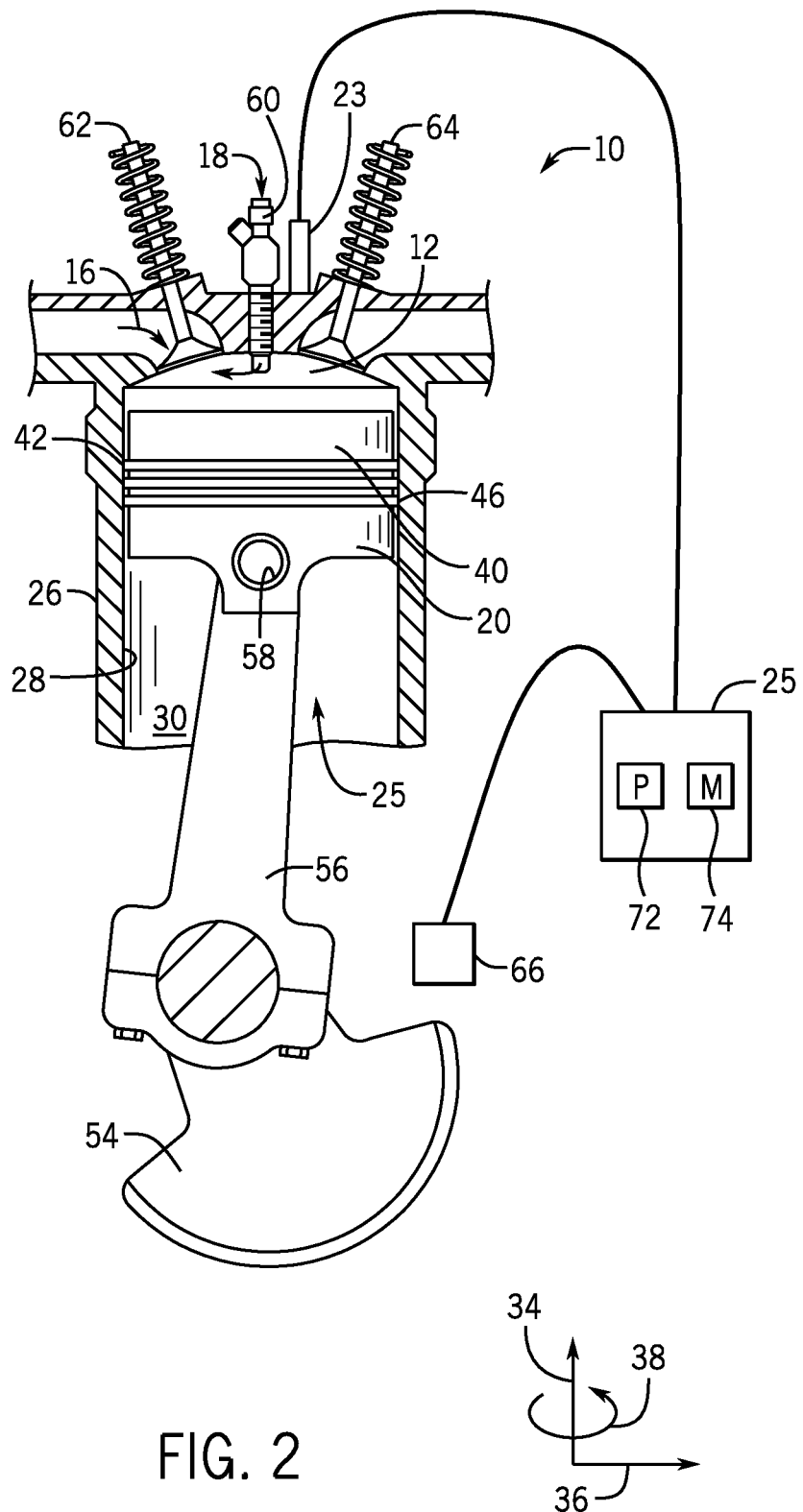
FIG. 2 is a side cross-sectional view of an embodiment of a piston assembly in accordance with aspects of the present disclosure.

FIG. 2 is a side cross-sectional view of an embodiment of a piston assembly having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 also includes a crankshaft sensor 66, the knock sensor 23, and the engine control unit (ECU) 25, which includes a processor 72 and memory 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft 54 angle. For example, a full cycle of a four stroke engine 10 may be measured as a 720° cycle. The knock sensor 23 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23. The crankshaft sensor 66 and the knock sensor 23 are shown in electronic communication with the engine control unit (ECU) 25. The ECU 25 includes a processor 72 and a memory 74. The memory 74 may store computer instructions that may be executed by the processor 72. The ECU 25 monitors and controls and operation of the engine 10, for example, by adjusting combustion timing, valve 62, 64, timing, adjusting the delivery of fuel and oxidant (e.g., air), and so on.

Advantageously, the techniques described herein may use the ECU 25 to receive data from the crankshaft sensor 66 and the knock sensor 23, and then to creates a "noise" signature by plotting the knock sensor 23 data against the crankshaft 54 position. The ECU 25 may then derive signatures corresponding to combustion and valve events, and then derive events from the signatures. The ECU 25 may then check the phasing of those events, relative to known crank angles and timed sparks, against a model or lookup table, as described in more detail below. The ECU 25 may then derive whether the knock sensor is working properly and/or wired to the correct cylinder. By deriving whether the knock sensor is wired correctly, and whether the knock sensor is functioning properly, the techniques described herein may enable a more optimal and a more efficient operations and maintenance of the engine 10.

Figure 3:
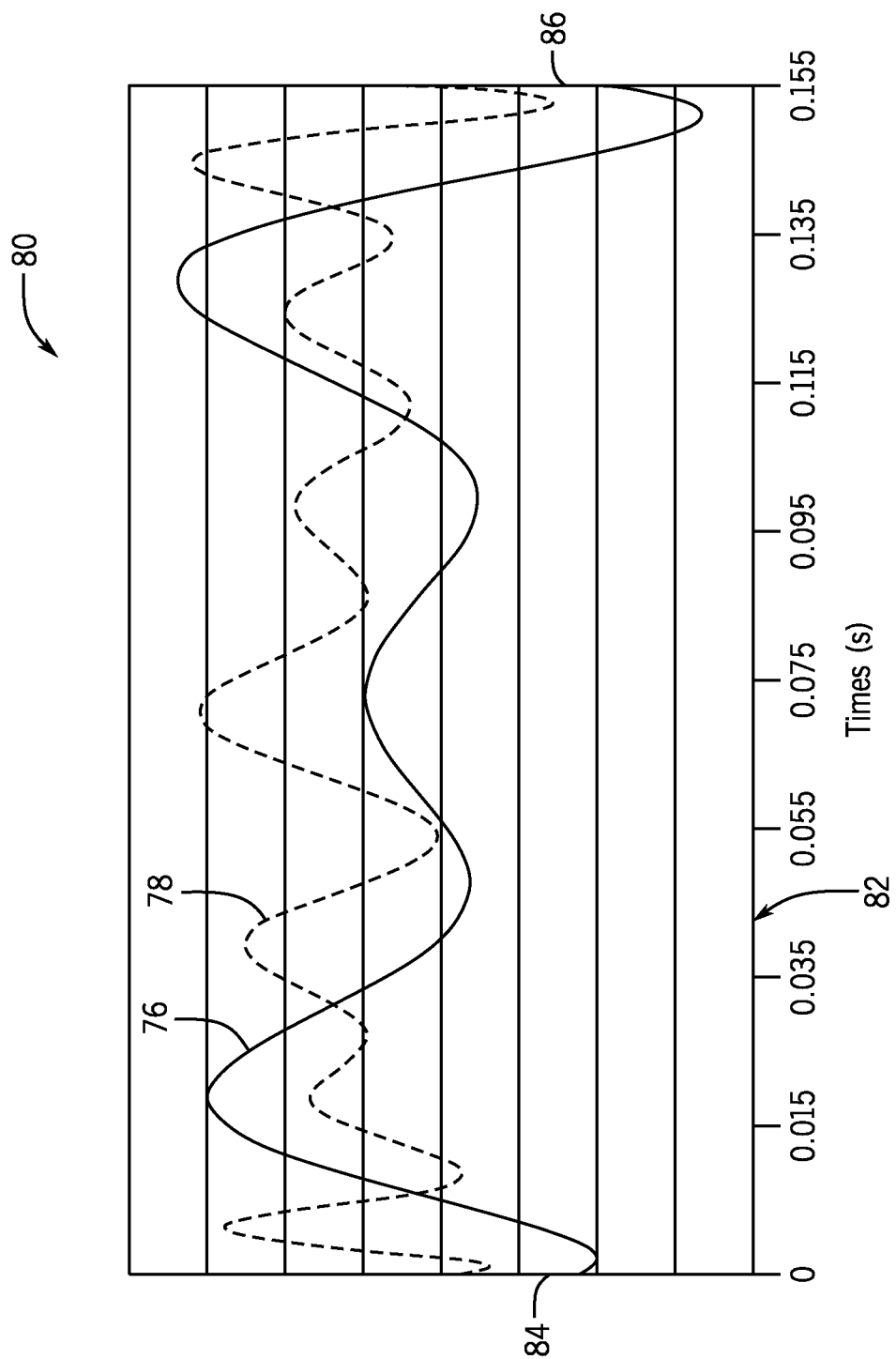
FIG. 3 is an embodiment of a combustion signature and a valve signature plotted over a first complete intake, compression, combustion and exhaust cycle in accordance with aspects of the present disclosure.

Once data from the knock sensor 23 is collected, one or more filters may be applied to the data to derive a combustion signature 76 (i.e., noise attributable to combustion events) and a valve signature 78 (i.e., noise attributable to valve 62, 64 movement). As is discussed in more detail with regard to FIG. 6, the combustion signature 76 and valve signature 78 may be derived by applying filters, fast Fourier transforms (FFT), or applying other digital signal processing (DSP) techniques to the sampled data. For example, the ECU 25 may derive the combustion signature 76 by applying a low pass filter at 1200 Hz or a band pass filter from 0.5 Hz to 1200 Hz. The valve signature may be derived using a band pass filter from 12 kHz to 18 kHz. FIG. 3 is an embodiment of a sample plot 80 of a combustion signature 76 and a valve signature 78 over a first complete intake, compression, combustion and exhaust cycle. The x-axis 82 is shown as time in seconds, but may also be shown as crank angle (see FIG. 4). The y-axis 84 on the left corresponds to the valve signature 78, and the y-axis 86 on the right corresponds to the combustion signature 76. Each of the y-axes 84, 86 represents the amplitude of the noise signature 76, 78. Depending upon the measurement technique and the preference of the user, the units may be dB, volts, or some other unit). Note that the scales of the y-axes 84, 86 are different because the amplitudes of the two signatures 76, 78 are different. FIG. 3 is illustrative of data that may be undergoing data processing, for example, via a process described in more detail with respect to FIG. 6. The data for FIG. 3 may include data transmitted via the knock sensor 23 and the crank angle sensor 66 once the ECU 25 has derived a combustion signature 76 and a valve signature 78 from the data using digital signal processing (DSP) techniques.

The combustion signature 76 includes significant combustion events, such as peak firing pressure (PFP) of both the measured cylinder 26, and the mating cylinder (i.e., the cylinder in the engine that is 360 degrees out of phase with the measured cylinder 26). The valve signature 78 includes the closing of the intake valve 62 and exhaust valve 64. Some combustion events, such as PFP, may appear in both the combustion signature and the valve signature. FIG. 3 shows slightly more than one complete combustion cycle, or 720 degrees of rotation (two complete revolutions) at the crankshaft 54. Each cycle includes intake, compression, combustion, and exhaust.

Figure 4:
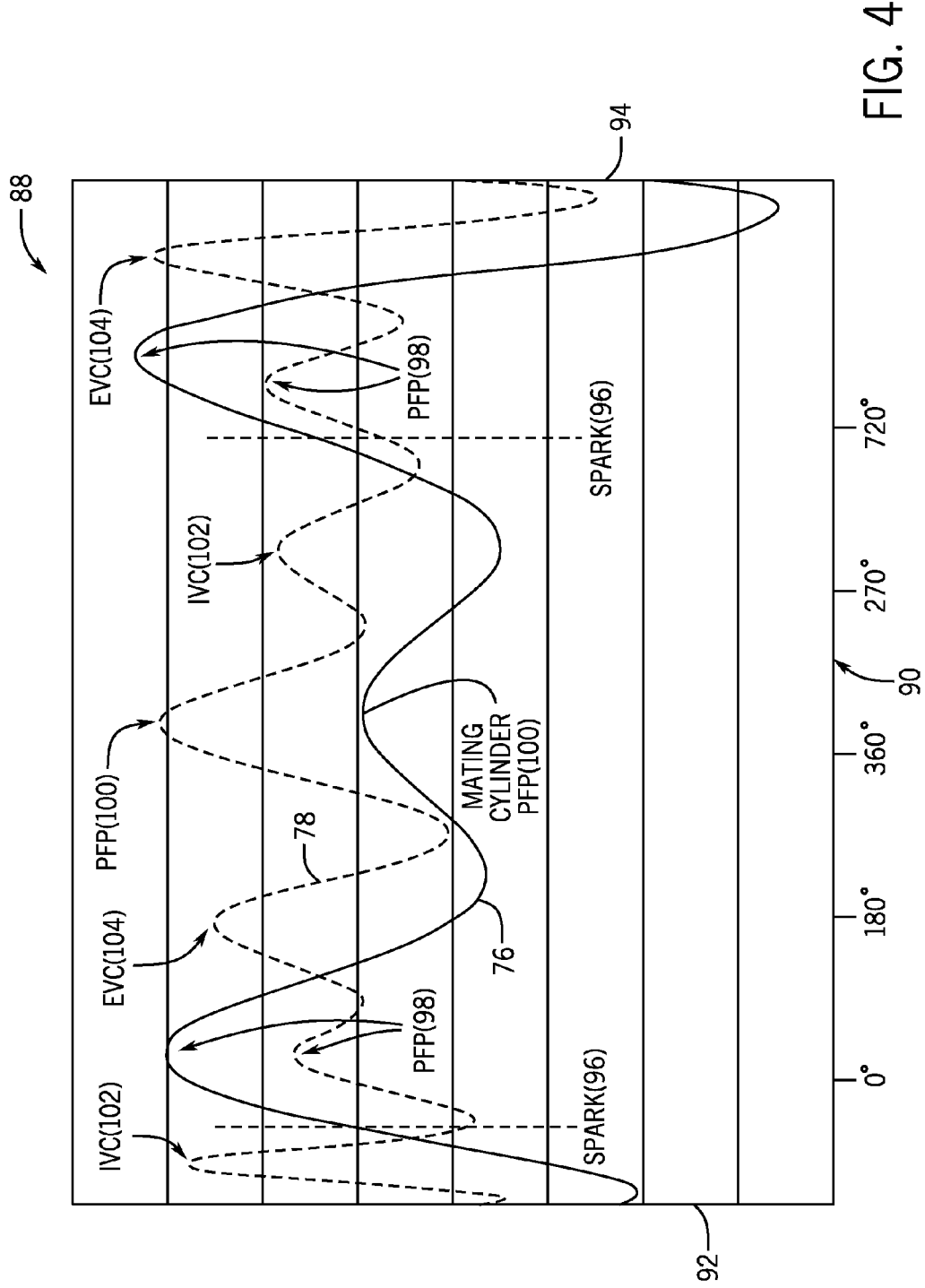
FIG. 4 is an embodiment of a combustion signature and a valve signature plotted over the first complete intake, compression, combustion, and exhaust cycle plotted by crank angle with derived events overlaid in accordance with aspects of the present disclosure.

FIG. 4 is an embodiment of a plot 88 of a combustion signature 76 and valve signature 78 over a first complete intake, compression, combustion, and exhaust cycle with events overlaid. The x-axis 90 is shown as crank angle in degrees. This is done by aligning the timing of the data sampled from the crankshaft sensor 66 and the data sampled from the knock sensor 23. Though engine timing is commonly expressed in crank angle degrees, in some embodiments the x-axis may be expressed in time (e.g., seconds) as in FIG. 3. As in FIG. 3, the y-axis 92 on the left side of plot 88 corresponds to the valve signature 78, and the y-axis 94 on the right side of the plot 88 corresponds to the combustion signature 76. The y-axes 92, 94 represent noise amplitude and depending upon the measurement technique and the preference of the user, the units may be dB, volts, or some other unit. Also as in FIG. 3, the scales of the two y-axes 92, 94 are different because the amplitudes of the two signatures are different. The events include timed spark 96, peak firing pressure (PFP) 98 of the monitored cylinder 26, PFP of the mating cylinder 100, intake valve closure (IVC)

102, and exhaust valve closure (EVC) 102. The mating cylinder is the cylinder in the engine that is 360 degrees out of phase with the measured cylinder 26 (i.e., the pistons of the mating cylinder and the measured cylinder are in the same positions, but the cylinders are in opposite phases of the combustion cycle). The timing of the timed spark 96 is known because the ECU 25 controls the spark timing. Because the spark is known to happen in between the intake valve closure (IVC) 102 and combustion (PFP) 98, the ECU 25 can check the phasing of the signal from the knock sensor 23 by comparing the sequence of events in the knock sensor 23 signal to the known timing of the spark 96. This will be explained in more detail when describing FIGS. 5 and 6. The increases in amplitude of the combustion signature 76 are due to combustion events in the measured cylinder 26 and the mating cylinder. As would be expected, the amplitude is greater for combustion events of the measured cylinder 26 than combustion events of the mating cylinder. The peaks in amplitude of the combustion signature 76 represent peak firing pressure (PFP) 98 in the measured cylinder 26, and mating cylinder PFP 100. The increases in amplitude in the valve signature 78 represent the closing of the intake valve 62 (IVC, 102) and the closing of the exhaust valve 64 (EVC 104). The valve signature 78 may also show increases in amplitude due to PFP 98 in the measured cylinder 26 and PFP of the mating cylinder 100. Because these events take place in a known order (i.e., IVC 102, PFP 98, EVC 104, mating cylinder PFP 100, IVC 102, etc.), at known crank angle positions, and produce different amplitudes (e.g., PFP 98 of the measured cylinder 26 will create a larger amplitude than mating cylinder PFP 100), the ECU can determine which increases in amplitude correspond with certain events. This will be discussed further in regard to FIG. 6. It should be understood, however, that these events are merely examples and that the ECU 25 may derive some or all of these events, as well as events not shown in FIG. 4.

Figure 5:
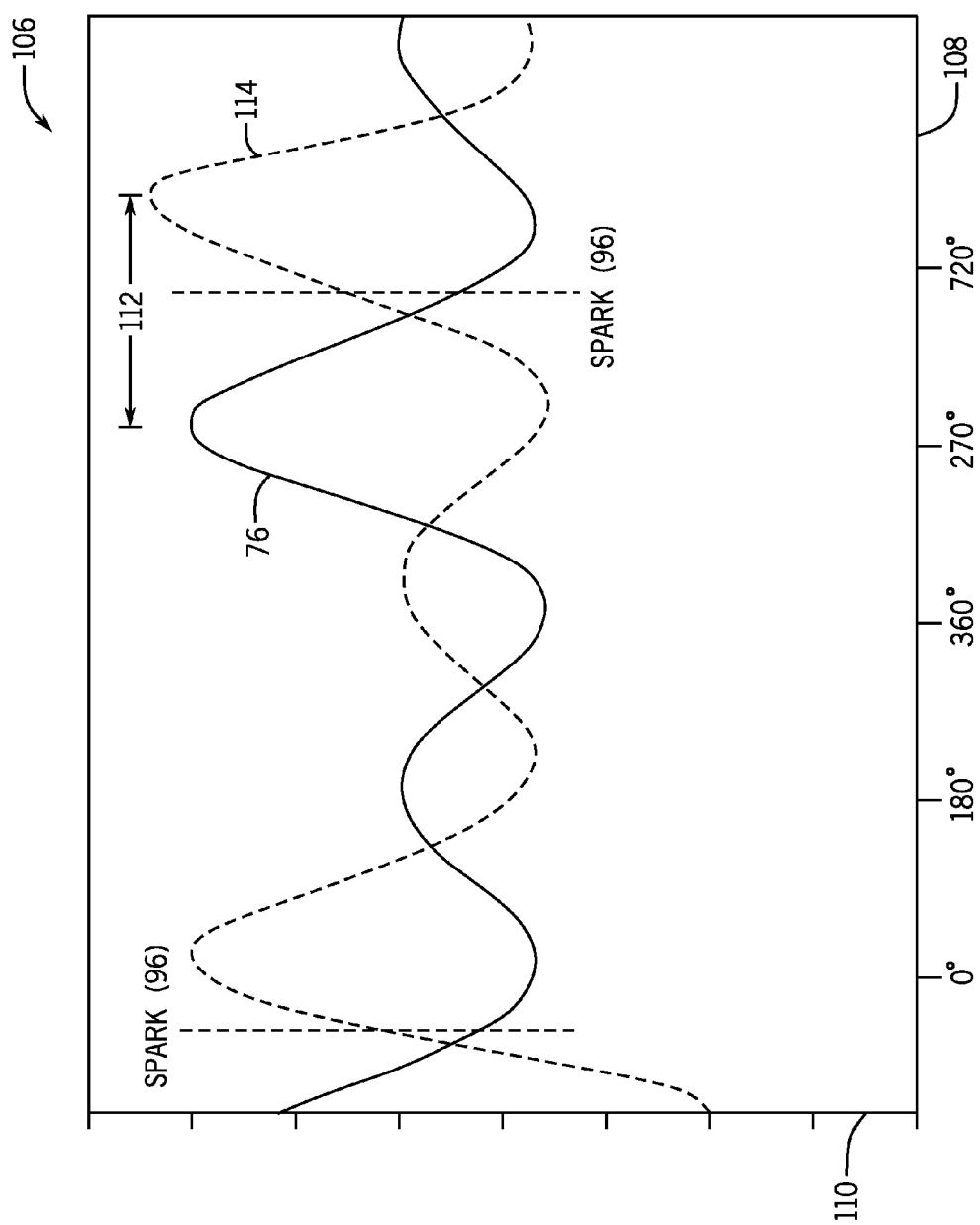
FIG. 5 is an embodiment of a combustion signature that is out of phase because the knock sensor may be miswired.

FIG. 5 is an embodiment of a plot 106 of a combustion signature 76 that is out of phase because the knock sensor 23 may be miswired (i.e., wired to the wrong cylinder). The x-axis 108 is shown as crank angle in degrees. Though engine timing is commonly expressed in crank angle degrees, in some embodiments the x-axis may be expressed in time (e.g., seconds) as in FIG. 3. The y-axis 110 represents noise amplitude. Depending upon the measurement technique and the preference of the user, the units may be dB, volts, or some other unit. It should be understood that in other embodiments, plot 106 could be created using the valve signature 78, or both the valve signature 78 and the combustion signature 76. However, for the sake of clarity, only the combustion signature 76 is shown in FIG. 5. Because the ECU 25 knows the timing of the timed spark 96 independent of the knock sensor data, and because the timed spark 96 is known to take place at a given crankshaft 54 angle, the ECU 25 can overlay the timed spark 96 on the combustion signature 76 (and/or the valve signature 78) and determine whether the phasing (i.e., the sequence and timing of events) of the signals is correct dependent upon whether the timed spark 96 happens in the expected place in the signal (e.g., 18 degrees before PFP 98 of the measured cylinder).

If the phasing of the signal is not correct, then the knock sensor may be miswired (i.e., connected to the wrong cylinder). If the knock sensor 23 is miswired, the ECU 25 will be able to derive events, but the events will not occur at the expected crank angles or relative to timed spark 96. If the knock sensor is miswired, the ECU 25 shifts the signal by a determined crank angle 112 or time period, resulting in shifted signature 114 wherein the timed spark 96 occurs at the expected crankshaft 54 angle. By determining that shift 112 may result in signal 114 having expected events at expected times or angles, the techniques described herein may provide for a more computationally efficient and more effective derivation of knock sensor issues. As previously discussed, for the sake of clarity, plot 106 only includes the combustion signature 76, but similar shifting could be done to the valve signature 78, or the unfiltered knock sensor 23 data. Indeed, by phase shifting various signatures (e.g., 76, 78), knock sensor issues may be detected.

Figure 6:
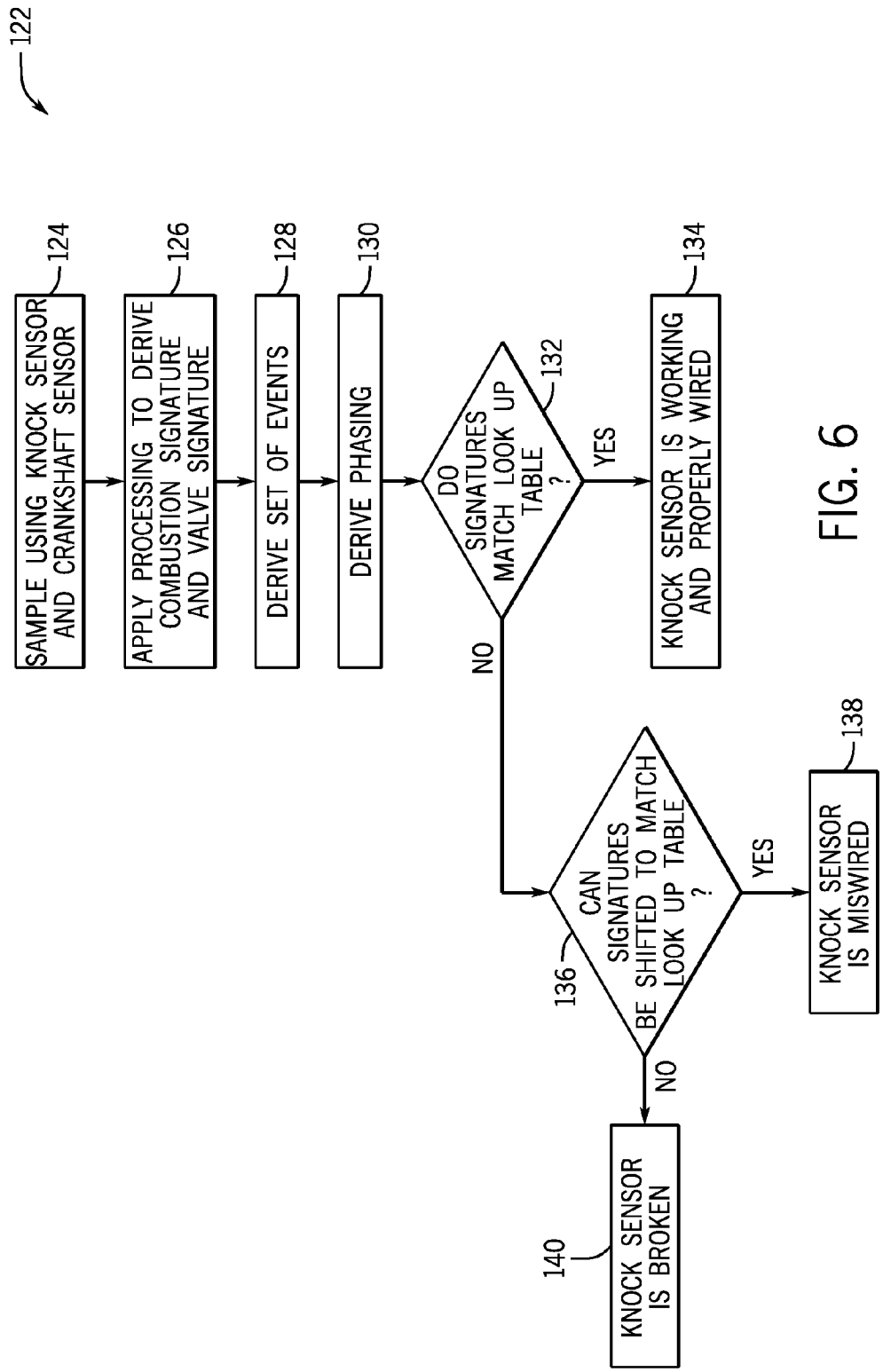
FIG. 6 is a flow chart showing an embodiment of a process for determining if the knock sensor is functioning properly and/or wired properly in accordance with aspects of the present disclosure.

FIG. 6 is a flow chart showing an embodiment of a process 122 for determining certain conditions of the knock sensor 23, such as if the knock sensor 23 is not functional and/or is miswired. The process 122 may be implemented as computer instructions or executable code stored in the memory 74 and executable by the processor 72 of the ECU 25. In block 124, a sample of data is taken using the knock sensor 23 and the crankshaft sensor 66. For example, the sensors 66, 23 collect signals or data and then transmit the signals or data to the ECU 25. The process 122 may then derive and log crankshaft 54 angles at the start of data collection and at the end of data collection, as well as the time and/or crankshaft 54 angle at the maximum amplitude and minimum amplitudes, or intermediate places within the signal.

In block 126, the process 122 processes the data to derive the combustion signature 76 and the valve signature 78, for the various cycles that were logged, as shown in FIG. 3. Block 126 may involve applying filters, fast Fourier transforms (FFT), or applying other digital signal processing (DSP) techniques to derive the combustion signature 76 and the valve signature 78. For example, the process 122 may derive the combustion signature 76 by applying a low pass filter at 1200 Hz or other natural frequencies that may be detected for the combustion event. The low pass filter may also be at 900 Hz, 1000 Hz, 1100 Hz, 1300 Hz, 1400 Hz, or 1500 Hz. Alternatively, the process 122 may derive the combustion signature by applying a band pass filter from 0.5 Hz to 1200 Hz. Similarly, the high and low ends of the band pass filter may vary. For example, the low end of the band pass filter may be 0.1 Hz, 0.3 Hz, 1 Hz, 3 Hz, 5 Hz, or 10 Hz. The high end of the band pass filter may be 900 Hz, 1000 Hz, 1100 Hz, 1300 Hz, 1400 Hz, or 1500 Hz. The valve signature may be derived using a band pass filter from 12 kHz to 18 kHz. Again, the high and low ends of the band pas filter may vary. For example, the low end of the band pass filter may be 9 kHz, 10 kHz, 11 kHz, 13 kHz, or 15 kHz. The high end of the band pass filter may be 16 kHz, 17 kHz, 19 kHz, 20 kHz, or 21 kHz. In general, the combustion signature 76 will be a lower frequency signal than the valve signature 78.

In block 128, the process 122 derives sets of events using the known crankshaft 54 angles and timed sparks 96, as shown in FIG. 4. The events include timed spark 96, peak firing pressure (PFP) 98 of the monitored cylinder 26, PFP of the mating cylinder 100, intake valve closure (IVC) 102, and exhaust valve closure (EVC) 102. The timing of the timed spark 96 is known because the ECU 25 controls the spark timing. The increases in amplitude of the combustion signature 76 are due to combustion events in the measured cylinder 26 and the mating cylinder. As would be expected, the amplitude is greater for combustion events of the measured cylinder 26 than combustion events of the mating cylinder. The peaks in amplitude of the combustion signature 76 represent peak firing pressure (PFP) 98 in the measured cylinder 26, and mating cylinder PFP 100. The peaks in amplitude in the valve signature 78 represent the closing of the intake valve 62 (IVC, 102) and the closing of the exhaust valve 64 (EVC 104). The valve signature 78 amplitude may also peak due to PFP 98 in the measured cylinder 26 and PFP of the mating cylinder 100. Because these events take place in a known order (i.e., IVC 102, PFP 98, EVC 104, mating cylinder PFP 100, IVC 102, etc.), at known crank angle positions and relative to known timed sparks 96, and produce different amplitudes (e.g., PFP 98 of the measured cylinder 26 will create a larger amplitude than mating cylinder PFP 100), the process 122 can determine which increases in amplitude correspond with certain events.

In block 130, the process 122 derives phasing (i.e., the timing, order, and/or sequence of events) from the combustion signature 76 and valve signature 78, relative to known crankshaft 54 angle and timed sparks 96 using a lookup table, a model, or some other predictive tool stored on the memory component 74 of the ECU 25. The process 122, based upon the data from the crankshaft sensor 66 and the known timed sparks 96, compares the phasing of events in the combustion signature 76 and the valve signature 78, to the known crankshaft 54 angle and timed spark 96, and then uses the lookup table or model to determine what the engine 10 should be doing at a given point in time. The lookup table may include a number of columns and rows that may include time, crankshaft angle, timed spark 96, PFP 98, IVC 102, EVC 104, other events, an expected amplitude or range of expected amplitudes, etc. Because certain events, such as PFP 98, appear in both the combustion signature 76 and the valve signature 78, the process 122 can check the phasing of the two signatures 76, 78 by comparing the phasing of the two signals against one another. If the known event happens in the same place in both signatures, then the knock sensor is likely not broken. Because the timing of the timed spark 96 is known independent of the knock sensor 23 data, the process 122 may also overlay the timed spark on the combustion signature 76 or the valve signature 78 to determine whether the derived events occur at the expected times relative to the timed spark 96. The process 122 may compare the two signatures 76, 78 to a lookup table or model. Because the crankshaft 54 angle and timed spark 96 are known variables, they can be plugged into the lookup table or model to predict when certain events should occur and/or what the predicted amplitude, or range of amplitudes should be.

In decision 132, the process 122 compares the combustion signature 76 and valve signature 78 derived from the knock sensor 23 data to the lookup table or model to determine whether or not the signatures 76, 78 match what is expected. For example, the combustion signature 76 may arrive at peak amplitude during peak firing pressure (PFP) 98 during combustion events. Similarly, the valve signature 78 may arrive at peak amplitude during intake valve closure (IVC) 102 and exhaust valve 64 closure (EVC) 104. The process 122 may also identify other events, such as the intake valve 62 opening, the exhaust valve 64 opening, piston 20 compression, or other events in the engine 10 cycle. The valve signature 78 may also include combustion events (e.g., PFP 98) of the measured cylinder 26, combustion events (e.g., PFP 100) of the mating cylinder, or other cylinders of the engine 10.

In block 134, if the combustion signature 76 and valve signature 78 match what is expected based on the crankshaft 54 angle and spark timing 96, the knock sensor 23 is determined to be properly wired and working properly. If the combustion signature 76 and valve signature 78 do not match what is expected based on the crankshaft 54 position and spark timing, the knock sensor 23 may be either miswired or not functioning.

In decision 136, the process 122 shifts the phasing of the signatures 76, 78 forward and backward in time by an interval 112 (as shown in FIG. 5) in an attempt to match the phasing of the signatures 76, 78 with what is predicted by the lookup table based upon known crankshaft angle 54 and timed spark 96. If the sensor is miswired, the events (i.e., PFP 98, IVC 102, EVC 104, mating cylinder PFP 100, etc.) will be present in the signatures 76, 78, but will not phase properly with the known crankshaft 54 angle and timed sparks 96. If the firing order of the cylinders 26 of the engine 10 is known, then the process 122 can determine the cylinder to which the miswired knock sensor 23 is coupled based on a time or crank angle interval 112 that the combustion signature 76 and valve signature 78 would be shifted in order for the phasing of the signatures to match the known crankshaft angle and spark timing 96. If shifting the signatures 76, 78 results in a match (decision 136) between the signals and the predicted phasing, then the process 122 may determine in block 138 that the knock sensor 23 is miswired.

If, however, shifting the signatures does not result in a match (decision 136) between the signatures 76, 78 and what was predicted, then the signals are likely due to random effects that do not line up with any known patterns. Accordingly, the process 122 may determine in block 140 that the knock sensor 23 is not functional or is unplugged.

Technical effects of the invention include systems and methods for diagnosing a knock sensor 23 including receiving data from the knock sensor 23 coupled to an engine, processing the data by applying low pass and band pass filters to derive a combustion signature and a valve signature, deriving one or more events from the signatures, and determining whether the one or more events took place at a known time or a known crank position using a lookup table. If the events happen at unexpected crank angles or times relative to the known timed spark, it may be determined that the knock sensor is wired to the wrong cylinder and the data may be shifted to correct the phasing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of diagnosing a knock sensor comprising:
   receiving knock sensor data from the knock sensor, wherein the knock sensor is configured to be coupled to an engine;
   applying one or more filters to the knock sensor data to derive one or more events from the knock sensor data; and
   comparing the one or more events to expected engine data to evaluate whether the knock sensor is functioning properly and correctly wired, functioning properly and miswired, or not functioning properly.

2. The method of claim 1, wherein applying one or more filters to the knock sensor data to derive the one or more events comprises deriving a combustion signature and a valve signature from the data.

3. The method of claim 2, wherein the one or more filters comprise a low pass filter.

4. The method of claim 2, wherein the one or more filters comprise a band pass filter.

5. The method of claim 1, wherein comparing the one or more derived events to expected engine data comprises:
using a lookup table to determine which of the one or more events should be occurring during operation of the engine at a known time or at a known crankshaft angle position.

6. The method of claim 5, comprising deriving that the knock sensor is functioning properly and correctly wired if the one or more events match the table events stored in the lookup table.

7. The method of claim 5, comprising:
phase shifting the knock sensor data if the one or more events do not match the table events stored in the lookup table;
deriving that the knock sensor is functioning properly and miswired if phase shifting the knock sensor data results in the one or more events matching table events stored in the lookup table; and
deriving that the knock sensor is not functioning properly if phase shifting the knock sensor data does not result in the one or more events matching the table events stored in the lookup table.

8. The method of claim 5, wherein table events stored in the lookup table comprise a peak firing pressure event, an intake valve closure event, or an exhaust valve closure event.

9. The method of claim 1, further comprising receiving crankshaft angle data from a crankshaft sensor.

10. A system comprising:
an engine control unit (ECU) configured to control an engine, wherein the ECU comprises a processor configured to:
receive a noise signal sensed by a knock sensor, wherein the knock sensor is configured to be coupled to an engine;
apply one or more filters to the noise signal to derive a combustion signature, a valve signature, and one or more events from the noise signal; and
compare the one or more events to expected engine data to evaluate whether the knock sensor is functioning properly and correctly wired, functioning properly and miswired, or not functioning properly.

11. The system of claim 10, wherein the one or more filters comprise a low pass filter to derive the combustion signature.

12. The system of claim 10, wherein the one or more filters comprise a band pass filter to derive the combustion signature, the valve signature, or both.

13. The system of claim 10, wherein the ECU is configured to:
use a lookup table to determine which of the one or more events are expected to be occurring during operation of the engine at a known time or at a known crankshaft angle.

14. The system of claim 13, wherein one or more table events stored in the lookup table comprise a peak firing pressure event, an intake valve closure event, or exhaust valve closure event.

15. The system of claim 10, wherein the ECU is further configured to receive crankshaft angle data from a crankshaft sensor.

16. A non-transitory computer readable medium comprising executable instructions that when executed cause a processor to:
receive engine noise data from a knock sensor, wherein the knock sensor is configured to be coupled to an engine;
apply one or more filters to the engine noise data to derive a combustion signature, derive a valve signature, and derive one or more events from the data; and
use a lookup table to compare the one or more events to expected engine data to evaluate whether the knock sensor is functioning properly and correctly wired, functioning properly and miswired, or not functioning properly.

17. The non-transitory computer readable medium comprising executable instructions of claim 16, wherein the one or more filters comprise a low pass filter to derive the combustion signature.

18. The non-transitory computer readable medium comprising executable instructions of claim 16, wherein the one or more filters comprise a band pass filter to derive the combustion signature, the valve signature, or both.

19. The non-transitory computer readable medium comprising executable instructions of claim 16 that when executed cause a processor to derive that the knock sensor is functioning properly and correctly wired if the one or more events match one or more table events stored in the lookup table.

20. The non-transitory computer readable medium comprising executable instructions of claim 16 that when executed cause a processor to:
shift the engine noise data if the one or more events do not match the one or more table events stored in the lookup table;
derive that the knock sensor is functioning properly and miswired if phase shifting the engine noise data results in the one or more events matching the one or more table events stored in the lookup table; and
deriving that the knock sensor is not functioning properly if phase shifting the engine noise data does not result in the one or more events matching the one or more table events stored in the lookup table.

* * * * *